Feb. 10, 1931.  C. F. MARSH  1,792,317
ATTACHMENT FOR CUTTING TORCHES
Filed Sept. 19, 1929
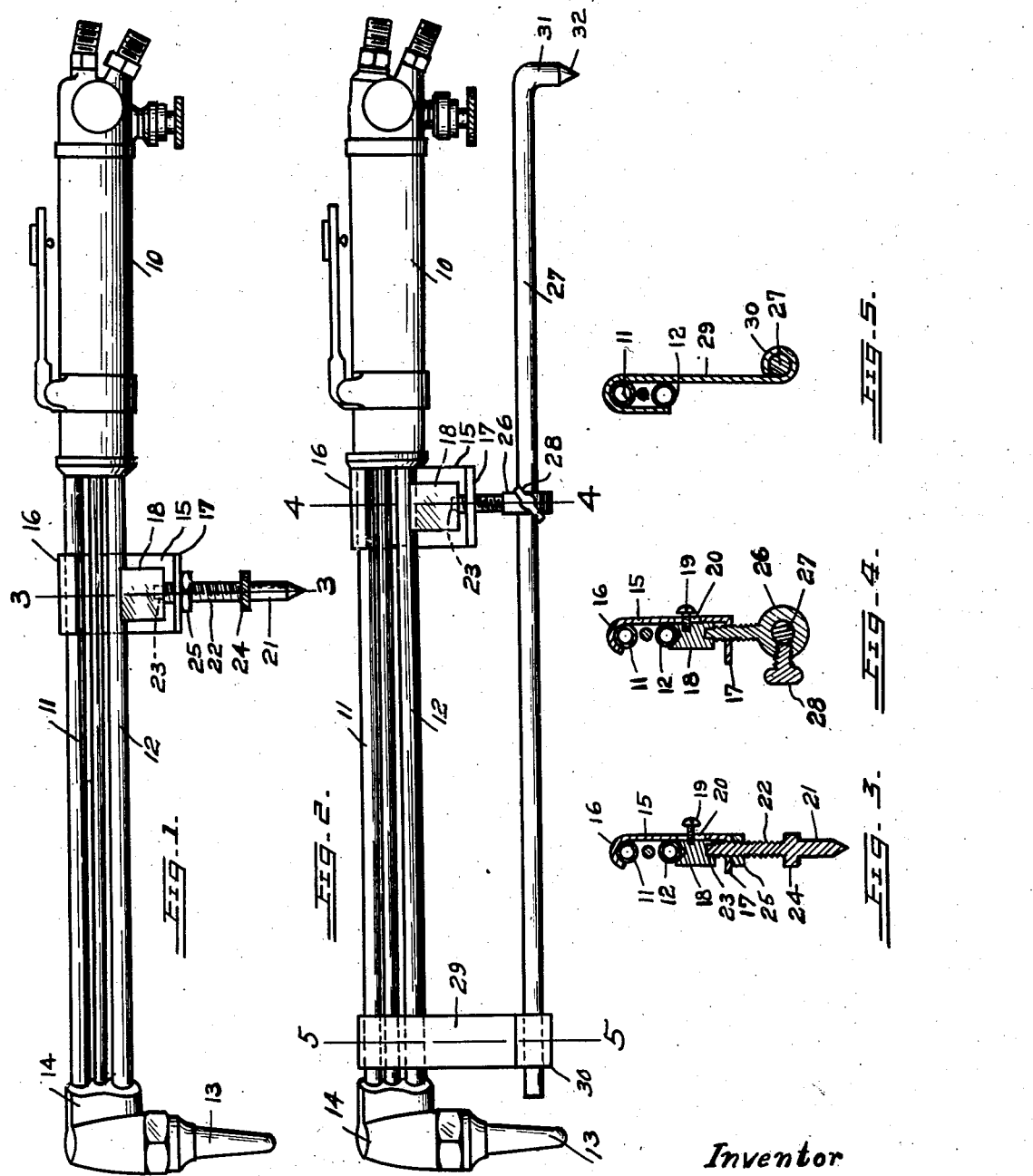
Inventor
Charles Frederick Marsh
By Frederick C. Bromley
Attorney Patented Feb. 10, 1931

1,792,317

UNITED STATES PATENT OFFICE

CHARLES FREDERICK MARSH, OF TORONTO, ONTARIO, CANADA

ATTACHMENT FOR CUTTING TORCHES

Application filed September 19, 1929, Serial No. 393,816, and in Canada March 13, 1929.

The invention relates to improvements in attachments for cutting torches as described in the present specification and shown in the accompanying drawings which form part of the same.

The invention consists essentially of a sliding device attached to the torch and carrying a centre which is placed in a prick punch mark made in the plate to be cut, and used as a centre about which the torch is swung in order to describe a circle of a given radius.

The invention has for its object the provision of an attachment for an acetylene torch to enable it to readily cut plate circularly upon accurate lines.

Referring to the drawings: Figure 1 is a side elevation of a conventional cutting torch showing the invention applied thereto.

Figure 2 is a similar view of this torch showing a slightly modified form of the invention applied thereto, this form being applicable for use in cutting circles of a larger diameter than that for which the form shown in Figure 1 is used.

Figure 3 is a vertical sectional view taken on the line 3—3 of Figure 1.

Figure 4 is a similar section taken on the line 4—4 of Figure 2.

Figure 5 is a similar section taken on the line 5—5 of Figure 2.

Like numerals of reference indicate corresponding parts in each of the figures throughout the drawings.

In the drawings, the reference numeral 10 generally denotes the handle of the cutting torch, which has the usual straight gas tubes 11 and 12 forwardly projecting therefrom, and 13 denotes the tip carried by the head end 14 of the torch.

Adverting first to Figures 1 and 3, 15 denotes a flat plate which is placed against the sides of the tubes 11 and 12 and provided with an upper curled end 16 that partly encircles the upper tube 11. The lower end of the plate is provided with an integral flange 17 situated at some distance below the lower tube 12 and extended therebeneath.

18 is a V block placed against the plate 15 so as to lie between the lower gas tube 12 and flange 17, the V of the block being adapted to fit against this gas tube. The block is movable to and away from the tube and is limited in its movement by a screw 19 projecting through a slot 20 in the plate and having screw threaded engagement with the block. 21 is a centre having a threaded shank 22 threadedly engaged with the flange 17 and projecting therethrough. The upper end is reduced to form a shoulder and fitted in a hole in the V block as at 23. An integral collar 24 serves to turn the centre, while a check nut 25 functions to secure it against movement.

By this construction it will be manifest that a slide is provided to carry the centre 21 which when slackened off enables the slide to transverse the gas tubes 11 and 12. The slide can be secured in any position on the tubes by merely tightening the centre so as to bring the V block 23 into clamping engagement with the tubes, the nut 25 being used to secure it in any position in which it may be set.

To cut the plate into a circular shape of any diameter the slide is first set to the proper radius of the diameter of the circle; for example: should it be desired to cut a 10" diameter the centre 21 is set on a radius of 5" from the tip 13 of the torch; the plate to be cut is prick punched at the centre of the circle, then the centre 21 is placed in the prick punch mark and the torch swung about the centre in order to describe a circle.

Referring to the modification of the invention shown in Figures 2, 4 and 5, this is used in cutting circles that do not lie within the traverse of the slide previously described. This consists of substituting an eye 26 for the centre 21. The rod 27 is inserted in this eye and clamped by a thumb screw 28. A bracket 29 is fitted over the gas tubes 11 and 12 and provided with an eye 30 which also receives the rod 27 so as to steady it. The end of the rod situated below the handle 10 is downwardly turned as at 31 and pointed to constitute a centre 32. This centre is fitted in the prick punch mark of the plate and the torch swung about it in order to describe a given circle. The rod is adjustable by shifting it longitudinally in the eyes 26 and 30 to secure the proper radius and is locked in any position by the thumb screw 28.

Whereas this invention has been shown and described as an attachment for a cutting torch it is to be understood that if so desired it could be constructed as a permanent part of a torch without departing from the spirit and scope of the invention.

What I claim is:—

1. An attachment for a cutting torch, comprising a plate curled at its top to fit onto the upper gas tube, a flange integral with the bottom of the plate and situated beneath the lower gas tube, a V block located between the said lower gas tube and the flange with its V engaging the tube, means for urging the block into clamping engagement with this lower tube, and a centre depending from said flange.

2. An attachment for a cutting torch, comprising a plate curled at its top to fit onto the upper gas tube, a flange integral with the bottom of the plate and situated beneath the lower gas tube, a V block located between the said lower gas tube and the flange with its V engaging the tube, a screw projecting from the block and fitting in a slot in the plate, and a centre having a shank threadedly engaging the flange and reduced at its upper end to form a shoulder engaging the block.

3. An attachment for a cutting torch comprising a plate curled at its top to fit onto the upper gas tube, a flange integral with the bottom of the plate and situated beneath the lower gas tube, a V block located between the said lower gas tube and the flange with its V engaging the tube, means for urging this block into clamping engagement with the lower tube, an eye depending from said flange, a bracket attached to the gas tubes apart from the said eye and providing a further eye in alignment therewith, a rod slidably fitted in said eyes, a centre at the end thereof, and means for locking the rod in various positions.

Signed at Toronto, Canada, the 7th day of September, 1929.

CHARLES FREDERICK MARSH.